(12) United States Patent
Chen

(10) Patent No.: US 12,709,356 B2
(45) Date of Patent: Aug. 18, 2026

(54) INTERNAL DRIVE WHEEL AND RELATED DEVICES

(71) Applicant: Shane Chen, Camas, WA (US)

(72) Inventor: Shane Chen, Camas, WA (US)

( * ) Notice: Subject to any disclaimer, the term of this patent is extended or adjusted under 35 U.S.C. 154(b) by 0 days.

(21) Appl. No.: 18/233,878

(22) Filed: Aug. 14, 2023

(65) Prior Publication Data

US 2024/0051640 A1 Feb. 15, 2024

Related U.S. Application Data

(60) Provisional application No. 63/525,718, filed on Jul. 9, 2023, provisional application No. 63/416,539, filed on Oct. 16, 2022, provisional application No. 63/397,892, filed on Aug. 14, 2022.

(51) Int. Cl.
*B62M 6/75* (2010.01)
*B60K 7/00* (2006.01)

(52) U.S. Cl.
CPC ............. *B62M 6/75* (2013.01); *B60K 7/0007* (2013.01)

(58) Field of Classification Search
CPC .... B60K 2007/0038; B60K 2007/0053; B60K 2007/0061; B62M 13/00; B62M 6/75; B62K 2204/00; B62K 11/007; B62K 1/00
See application file for complete search history.

(56) References Cited

U.S. PATENT DOCUMENTS

| | | | | |
|---|---|---|---|---|
| 3,044,518 A * | 7/1962 | Wells | B60B 9/06 | 301/38.1 |
| 3,161,248 A * | 12/1964 | Edwards | B60K 7/0007 | 180/385 |
| 3,477,536 A * | 11/1969 | Carini | B60K 17/145 | 310/67 R |
| 3,812,928 A * | 5/1974 | Rockwell | B60L 50/51 | 310/67 R |
| 6,321,863 B1 * | 11/2001 | Vanjani | B60L 50/66 | 180/206.5 |
| 7,673,719 B2 * | 3/2010 | Buschena | B60K 17/043 | 474/146 |
| 8,397,854 B1 * | 3/2013 | Nam | B62K 25/283 | 180/211 |
| 2002/0011368 A1 * | 1/2002 | Berg | B60K 7/00 | 180/218 |
| 2003/0015360 A1 * | 1/2003 | Villeneuve | B60K 7/0007 | 180/65.6 |
| 2006/0279057 A1 * | 12/2006 | Shimizu | B62K 1/00 | 280/205 |
| 2008/0179125 A1 * | 7/2008 | Glover | B62K 25/24 | 180/219 |
| 2016/0068056 A1 * | 3/2016 | Burtov | B60K 7/0007 | 180/65.51 |

* cited by examiner

*Primary Examiner* — Jason D Shanske

(57) ABSTRACT

A wheel having a rim support structure that affords access to a load connection structure within the wheel. The load connection structure may be configured for movement in response to a force. A rotatable mount bracket is provided on the rim support structure and guides movement of the load connection structure. Embodiments of the wheel device may include internal drive and non-internal drive, roller- and gear-based driving, access on one or both sides of the wheel device, and other features.

14 Claims, 19 Drawing Sheets

INTERNAL DRIVE WHEEL AND RELATED DEVICES

CROSS REFERENCE TO RELATED APPLICATIONS

This application claims the benefit of U.S. Provisional Application No. 63/397,892, filed Aug. 14, 2022, entitled A Wheel Structure, and having the same inventor(s) as above.

This application claims the benefit of U.S. Provisional Application No. 63/416,539, filed Oct. 16, 2022, entitled A Wheel Structure B, and having the same inventor(s) as above.

This application claims the benefit of U.S. Provisional Application No. 63/525,718, filed Jul. 9, 2023, entitled Two-Wheel Vehicle, and having the same inventor(s) as above.

FIELD OF THE INVENTION

The present invention relates to a wheel with an internal drive mechanism and, more specifically, to improved drive and shock absorption in such a wheel.

BACKGROUND OF THE INVENTION

Various internal drive wheels are known in the art. Some of these utilize a rubber type friction roller, powered by a motor, that drives the inner rim of the wheel. In these devices, a circumferential V or T groove/protrusion or the like is often provided to align the roller and the rim. This arrangement is disadvantageous because the friction created by the groove/protrusion increases drag and is energy inefficient.

Non-friction drive mechanisms, such as those using a gear or pulley, are also known in the art.

SUMMARY OF THE INVENTION

Accordingly, it is an object of the present invention to provide an internal drive wheel with an energy efficient drive mechanism.

It is another object of the present invention to provide a wheel that allows attachment of a load platform through the wheel cover.

It is yet another object of the present invention to provide such a wheel with shock absorption.

It is also an object of the present invention to provide such a wheel with a regenerative shock absorption arrangement to produce electricity from shock forces (e.g., for charging an onboard battery, etc.).

These and related objects of the present invention are achieved by use of an internal drive wheel as described herein.

The attainment of the foregoing and related advantages and features of the invention should be more readily apparent to those skilled in the art, after review of the following more detailed description of the invention taken together with the drawings.

BRIEF DESCRIPTION OF THE DRAWINGS

FIG. 11B is a perspective non-cutaway side view of the device of FIG. 8 with load connect 330 under load.

FIG. 15 is a perspective view of an electronic unicycle device 5 having an internal drive wheel, while

DETAILED DESCRIPTION

Figure 1:
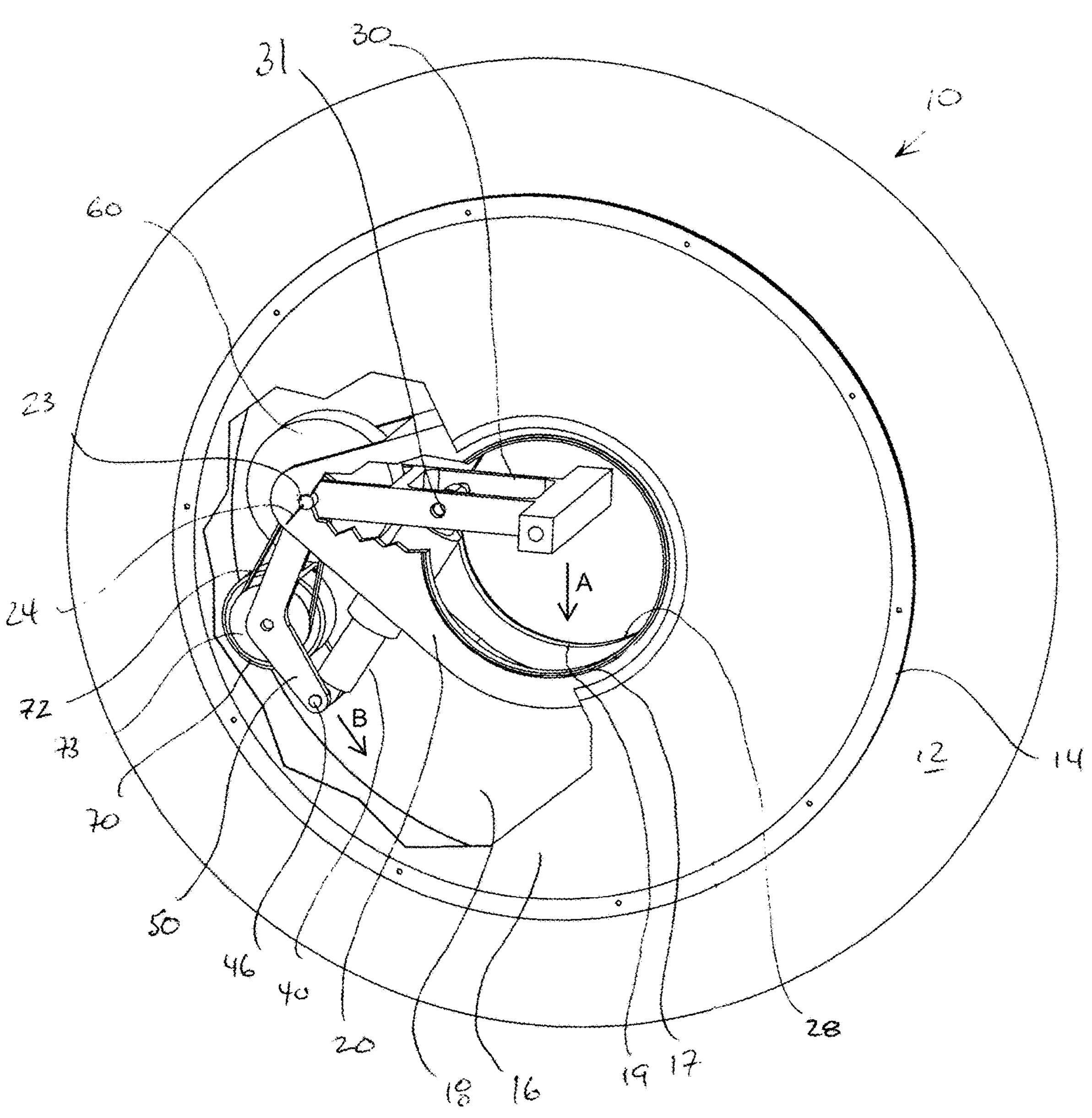
FIGS. 1-2 are perspective, partial cutaway views of an internal drive wheel (or device) 10 in accordance with the present invention.
Figure 2:
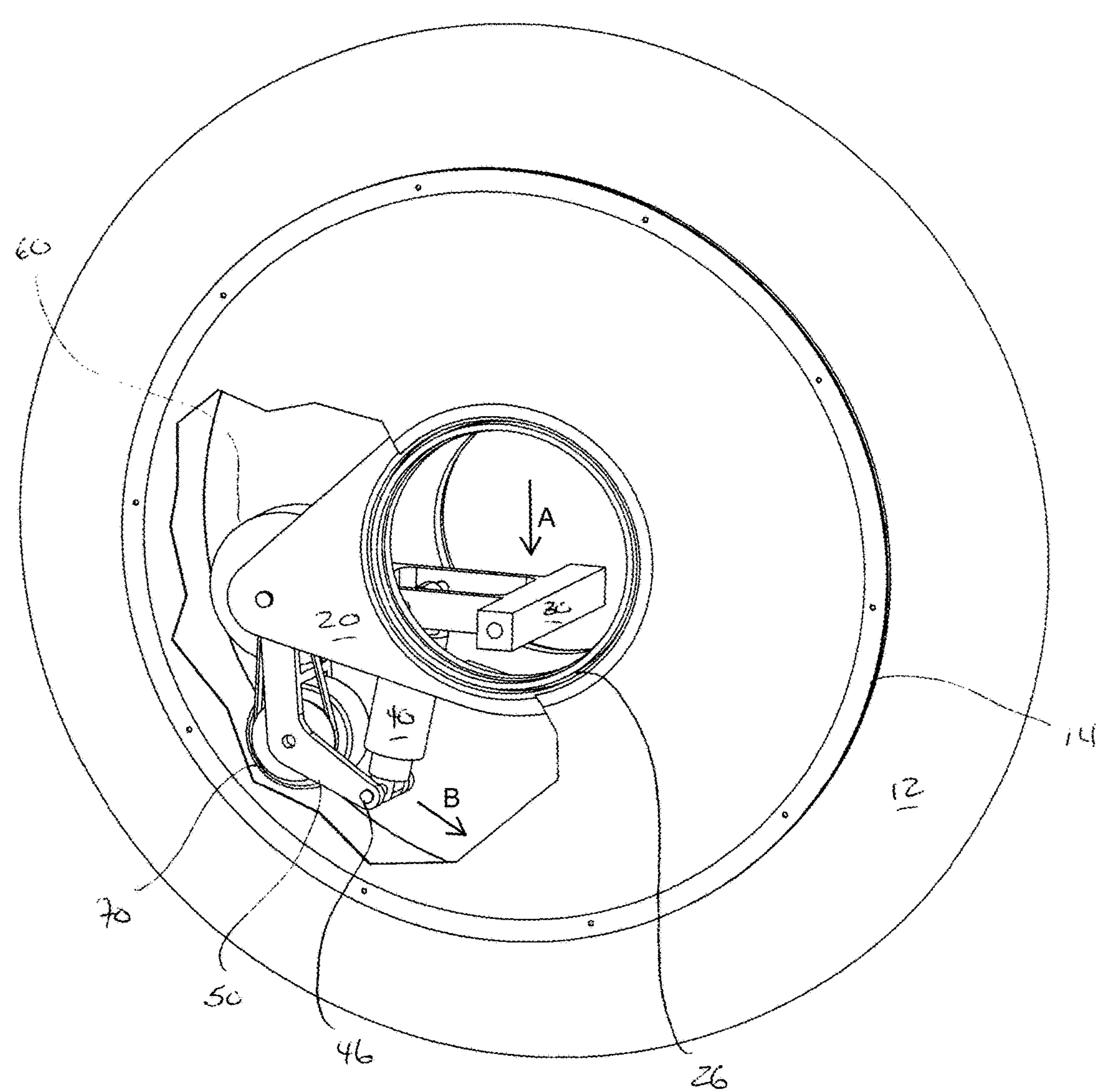

Referring to FIGS. 1-2, perspective, partial cutaway views of an internal drive wheel (or device) 10 in accordance with the present invention are shown. FIG. 1 illustrates a platform or load connection structure ("load connect") 30 in a normal or at rest position, while FIG. 2 illustrates load connect 30 in a shock absorber compressed position, the shock absorber 40 being compressed. The load connect 30 is the structural member to which a load platform is attached. This may be paired foot platforms, as in a unicycle device (FIG. 15) or a chassis or frame as in a device having 2 or more wheels, such as a hoverboard, 2-wheeled "car" (FIG. 16), 4-wheeled car, trailer, or other device.

In FIGS. 1-2, a housing cover 16 is partially cutaway and, in FIG. 1, the mount bracket 20 is partially cutaway and an annular bearing 26 removed. This is done to better illustrate components of wheel 10.

Wheel 10 may include a tire 12, a rim 14, and two housing covers 16,18 provided on each side of rim 14. One or more of the covers (both in FIG. 1) have a central opening 17,19 at which annular bearings 26,28, respectively, are mounted. These bearings 26,28 are effectively paired and coupled to the mount bracket 20 that rotates, due to the bearings 26,28, about the periphery of openings 17,19. The housing covers may structurally support the bearings and hence the mount bracket. Mount bracket 20 includes an extension 21 having a pivot structure 23 (with a pivot axis 24) at which the load connect 30 is coupled to the mount bracket 20.

A drive sled structure ("sled") 50 holds components of the drive system, thus interconnecting and positioning them. These include a motor 60, a rubber type friction roller 70 (that is in contact with an inner surface of) rim 14, a timing belt 72, and a timing pulley 73. Motor 60 drives roller 70 via the belt and pulley. Speed reduction may be provided in various ways, for example, within the motor, or the roller, through various gear arrangements, or other. And motor 60 could alternatively be located within roller 70, in a direct drive arrangement. The inner surface of rim 14 is preferably configured for good frictional contact with roller 70.

The mount bracket 20, load connect 30, and sled 50 are preferably coupled at pivot structure 23, and configured to pivot about axis 24. The load connect is also pivotally mounted to shock absorber 40 at pivot 31. The lower end of the shock absorber is pivotally coupled to the lower end of drive sled 50, at pivot 46.

Drive motor 60 is mounted on sled 50 and is preferably coaxial with axis 24. As weight is put on load connect 30, that weight is transferred through shock 40 to roller 70 which is pressed onto rim 14. The more weight, the more pressure exerted by the roller on the rim and thus the more friction between the roller and rim. This ensures good roller-rim contact and effective rim driving.

It can be seen that when a downward force is applied to load connect 30 (or the bottom of the wheel is driven up towards it, such as when the wheel hits a bump (this force is indicated by Arrow A), shock absorber 40 is compressed and load connect 30 moves down in relative to openings 17,19. Also, sled 50 moves downward, and mount bracket 20 rotates about bearings 26,28. The movement of these components is indicated by Arrow B. In the absence of a compressing force, mount bracket 20, load connect 30, and sled 50 return to their normal position.

The paired bearings hold mount bracket 20 in a fixed alignment which, in turn, maintains roller wheel 70 appropriately position on rim 14.

Figure 3:
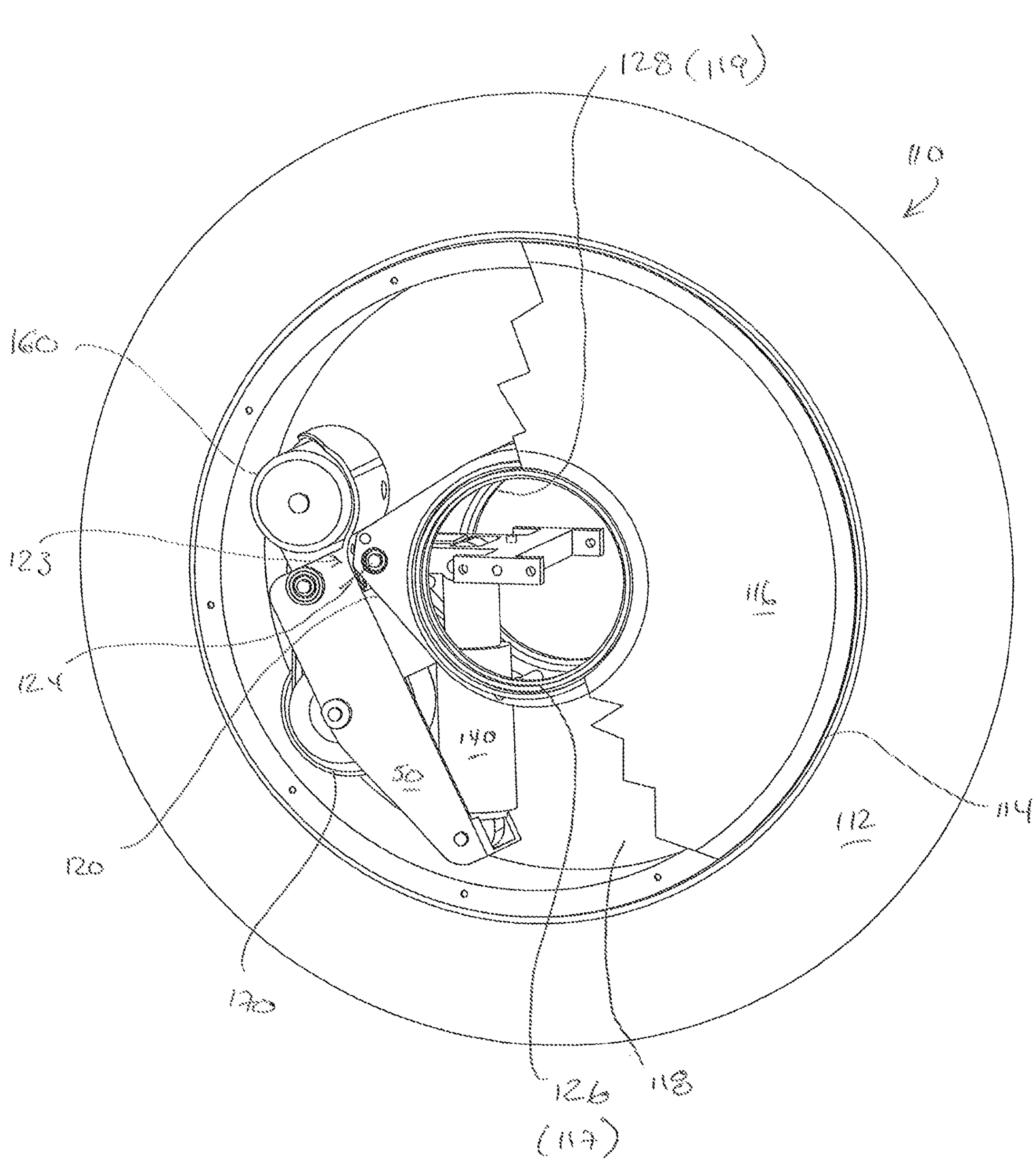
FIGS. 3-4 are a perspective, partial cutaway side view, and a close-up sectional view of another embodiment of an internal drive wheel 110 in accordance with the present invention.

Referring to FIG. 3, a perspective, partial cutaway side view of another embodiment of an internal drive wheel 110 in accordance with the present invention is shown.

Wheel 110 includes many of the same components as wheel 10 above, and like components are often labelled with reference numerals having the same last two digits. There may be differences between components (as shown and described herein, at least in part) and in some instances, there may be no difference. For example, the mount bracket 120 serves a similar function to that of mount bracket 20, yet the shape of the bracket and its pivot connections are arranged somewhat differently.

Wheel 110 preferably includes a tire 112, a rim 114, and two housing covers 116,118 provided on each side of rim 114 (only one of which is shown due to the perspective of the figures), and relatively large central opening 117,119 at which annular bearings 126,128, respectively, are mounted. Bearings 126,128 are paired and coupled to rotatable mount bracket 120 and function in a manner similar to bearings 126,128. Mount bracket 120 includes an extension 121 (which may be smaller than that of bracket of FIG. 1) that has a pivot structure 123 and a pivot axis 124 at which the load connect 130 is pivotally coupled to the mount bracket 120.

Shock absorber 140 is coupled between the load connect 130 and a bottom end of sled 150, yet in contrast to device 10, the drive sled 150 and/or motor 160 are not pivotally coupled at pivot 123. Motor 160 is mounted on sled 150 yet is not coaxial with pivot axis 124.

Figure 4:
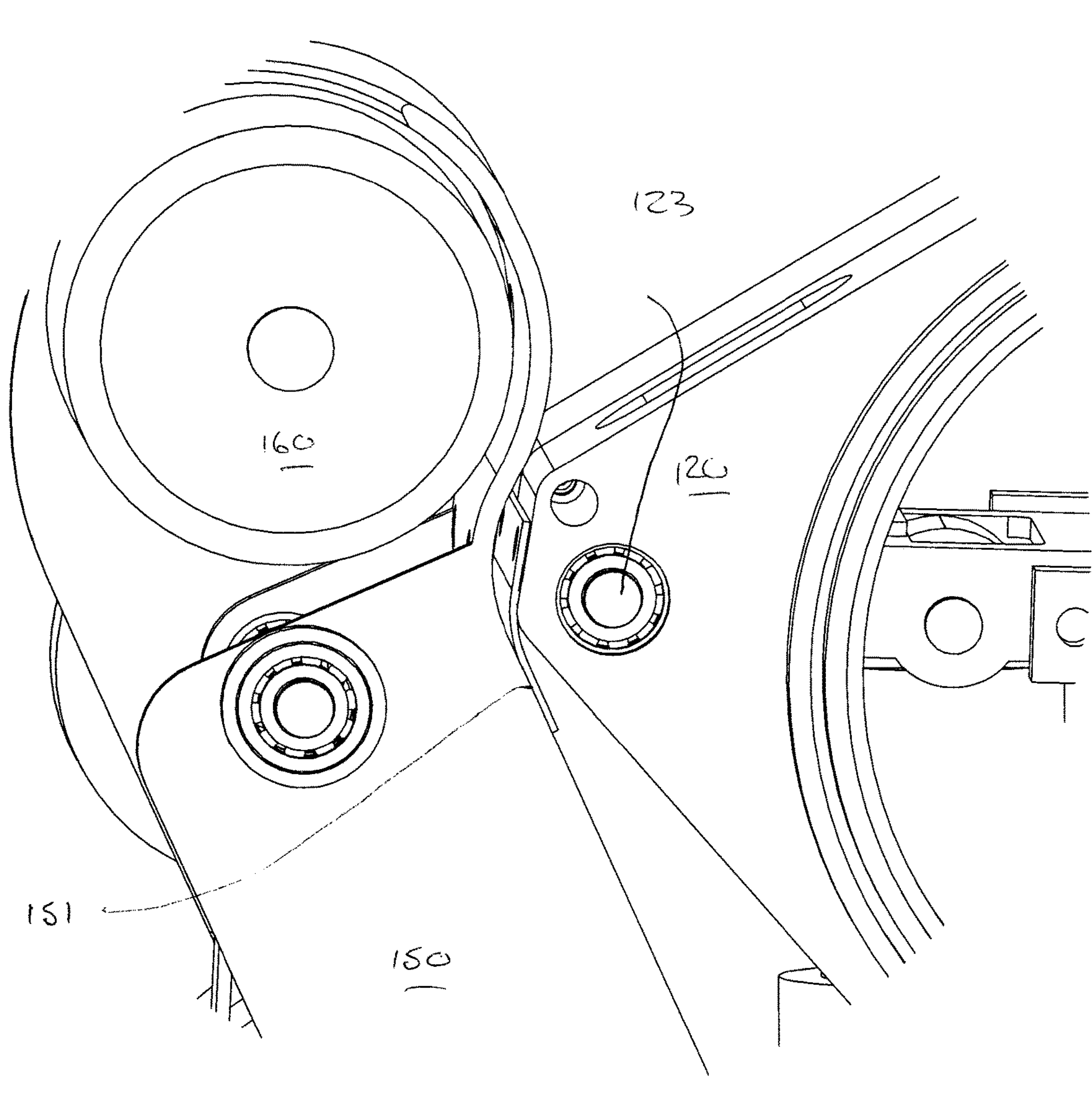

FIG. 4 is a close-up of a section of wheel 110 of FIG. 3 and illustrates a spring metal 151 or the like provided between mount bracket 120 and sled 150. This spring affords movement of the sled relative to the mount bracket to compensate for movement due to compression of the rubber of roller 170 under varying compressive forces.

Figure 5:
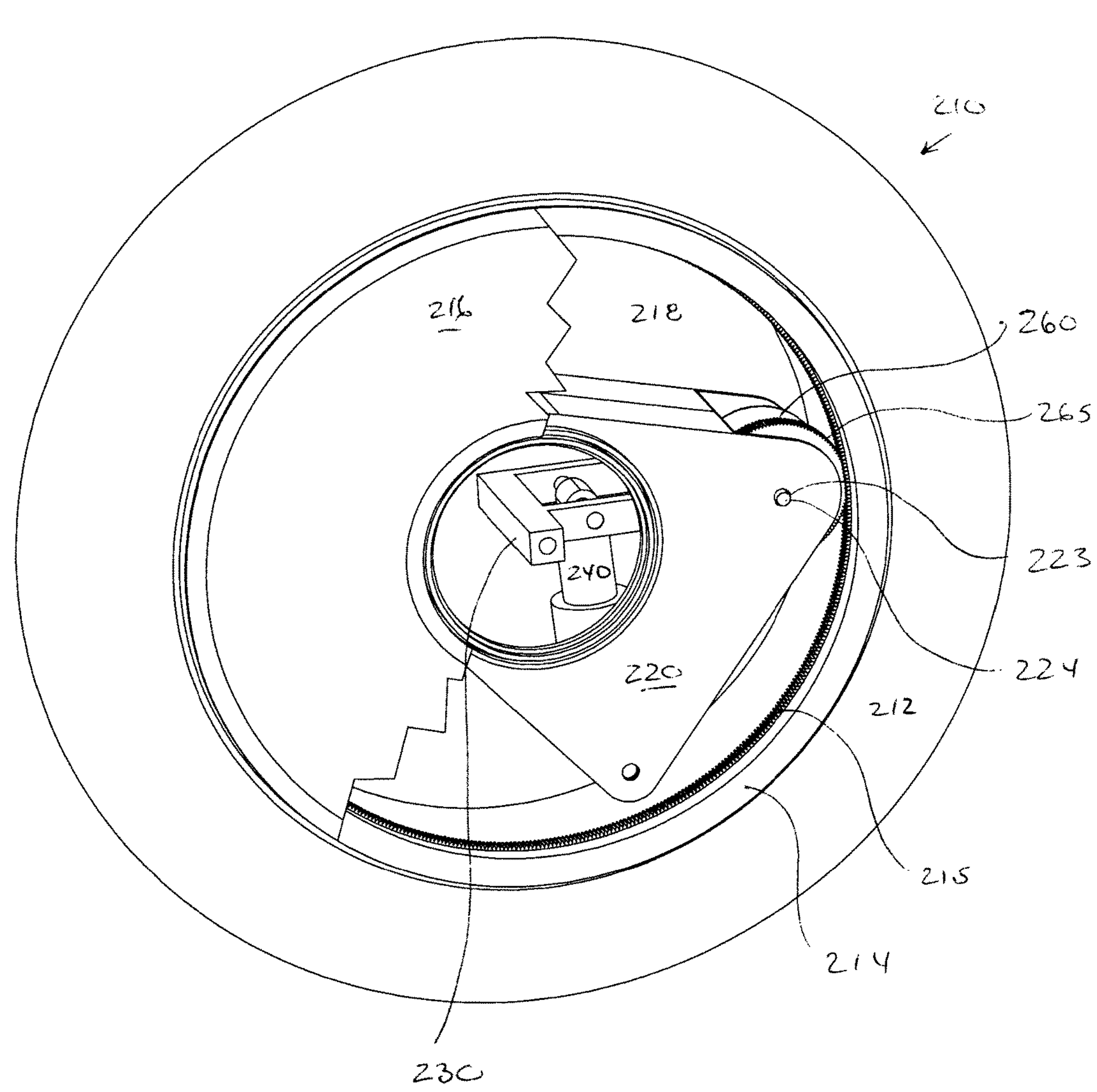
FIGS. 5-6 are perspective side views of another embodiment of an internal drive wheel 210 in accordance with the present invention.
Figure 6:
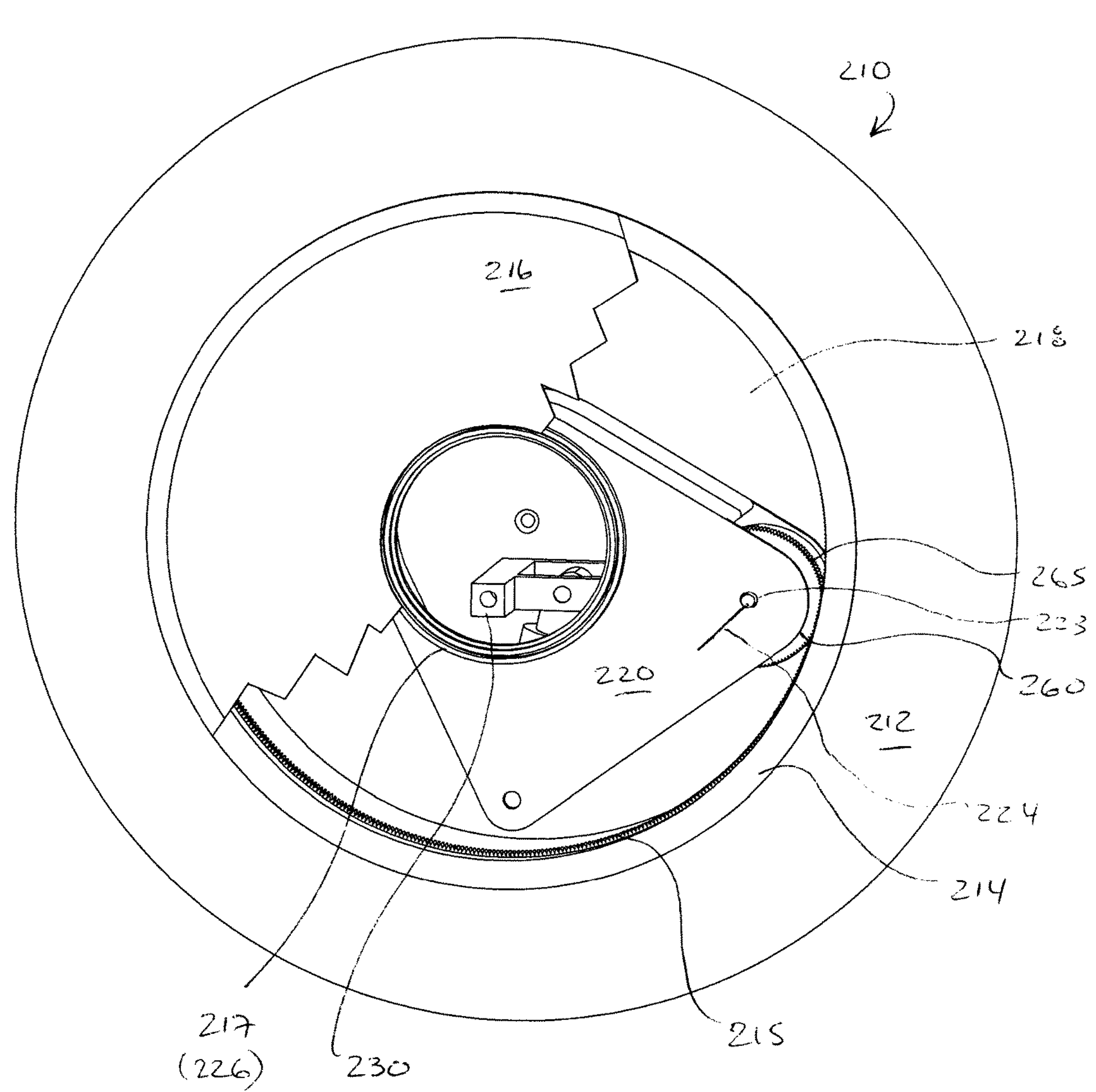

Referring to FIGS. 5-6, perspective side views of another embodiment of an internal drive wheel 210 in accordance with the present invention are shown. Device 210 is similar to devices 10 and 110 above, yet includes a gear arrangement 265 for driving the wheel rim 214.

Device 210 may include components that are the same or similar to those in devices 10 and 110. For example, device 210 may include a tire 212, rim 214, covers 216,218, and opening 217 through which a load connect 230 is accessible. Mount bracket 220 is rotatably mounted to cover 216,218.

In device 210, the inner rim includes circumferentially disposed gear teeth 215. These are engaged by gear arrangement 265 that is coaxially mounted on the motor rotor 261 and driven by motor 260. The gear arrangement 265 can also have a separate gear wheel driven by another gear on the motor shaft for more speed reduction. Load connect 230 is pivotally coupled to pivot structure 223 at pivot axis 224 and to shock absorber 240 at pivot 231. The bottom of shock absorber 240 is coupled to bottom part of mount bracket 220 at pivot 246. Motor 260 is mounted to mount bracket 220 and is preferably coaxial with pivot axis 224, yet may be otherwise arranged. An advantage of a coaxial arrangement is to not have the heavy motor move up and down during shock induced compression and decompression. If the motor is mounted to the load connect, then it is desirable to have the motor coaxial with the pivot axis 224 to maintain proper engagement of the motor gear 265 with teeth 215.

Further, cover or support 216 defines a relatively large opening 217 at which bearing 226 is mounted, and through which the load connect 230 is accessible. On the other side of the wheel (shown in FIG. 6), cover 218 does not provided an opening, and thus does not allow access to load connect 230. This arrangement is suitable, for example, when two wheels 210 are provided and a load platform is mounted between them (as in FIG. 16).

FIG. 6 shows load connect 230 experiencing a shock force. The shock absorber compresses, the load connect lowers and the mount bracket rotates.

Figure 7:
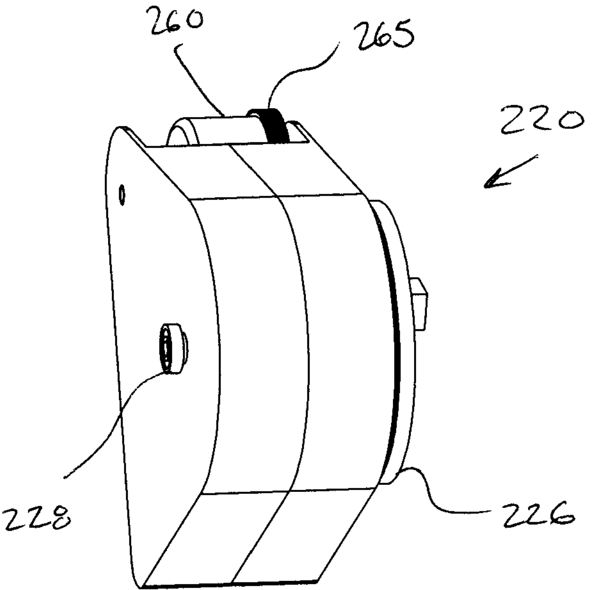
FIG. 7 is a perspective view of a rotatable mount bracket for use in the device of FIGS. 5-6.

Referring to FIG. 7, a perspective view of a rotatable mount bracket 220 (for use in device 210) is shown. This bracket 220 has one large bearing 226 and one small bearing 228. They are aligned coaxially and configured such that, under shock, mount bracket 220 retains alignment as it rotates.

Referring to FIGS. 8-11B, perspective side views (FIGS. 8-10 cut-away, FIGS. 11A-11B not) of another embodiment of an internal drive wheel 310 in accordance with the present invention are shown. Device 310 preferably includes a tire (not shown), rim 314, housing covers 316,318, opening 317 through which a load connect 330 is accessible, shock absorber 340, sled 350, motor 360 and roller 370.

Mount bracket 320 is preferably circular and aligned with and mounted to the bearings 326,328. A pivot structure 323 (at pivot axis 324) is preferably coupled, through a cover 327 of opening 317 (see FIG. 11), to load connect 330, and motor 360. Cover 327 is coupled to and rotates with the mount bracket, and sled 350 is pivotally coupled to pivot structure 323 and supports the roller. Shock absorber 340 is coupled between the load connect and the bottom end of the sled 350, as was the case in other embodiments herein. Roller 370 is driven via belt 372.

In contrast to the embodiments of FIGS. 1-4 in which the pivot axis 23,123 was (radially) outside of the bearing openings (17,117), in device 310, the pivot structure 323 is within the bearing opening 317.

Figure 8:
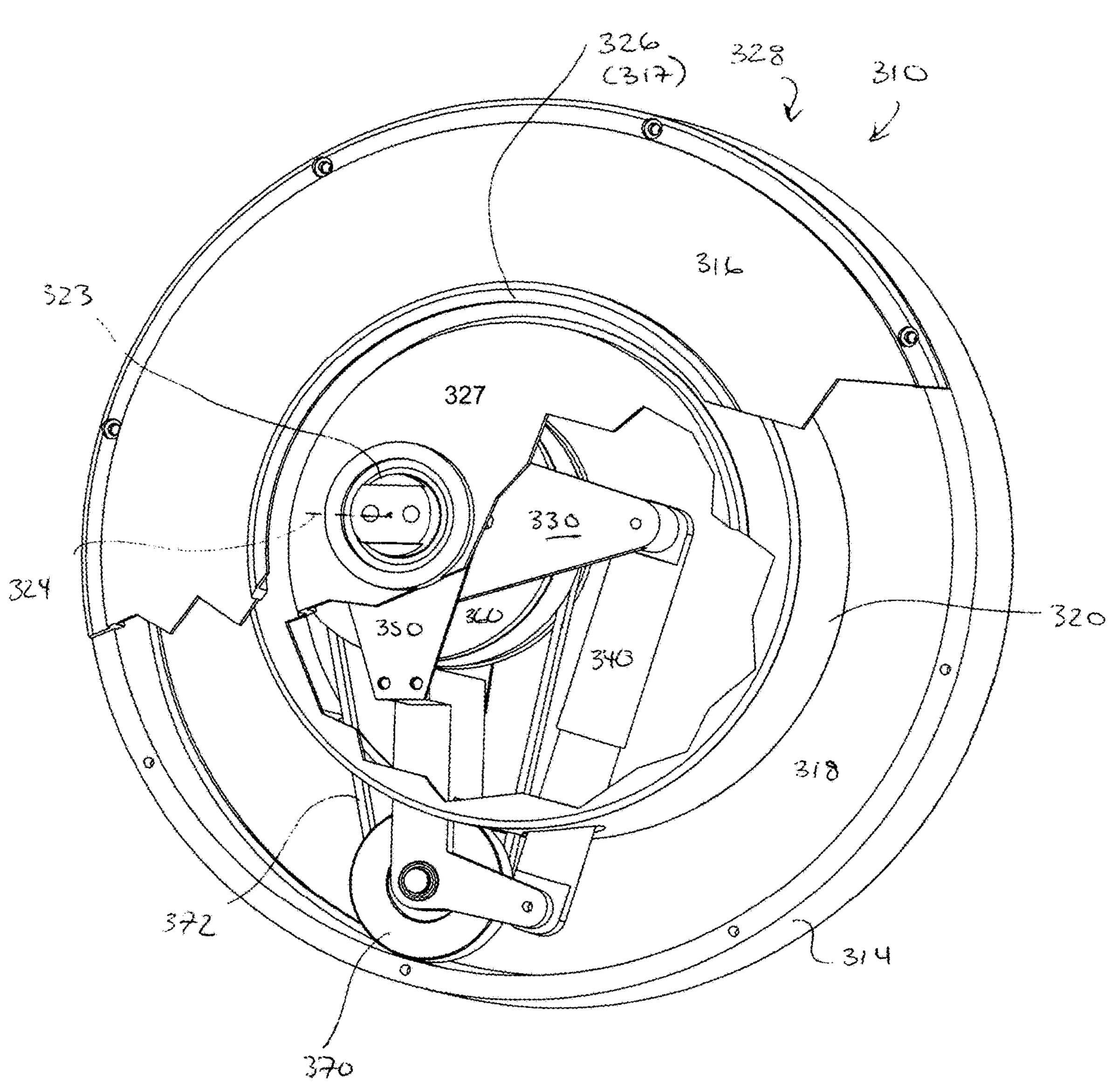
FIG. 8 is a perspective side view of another embodiment of an internal drive wheel 310 in accordance with the present invention.
Figure 9:
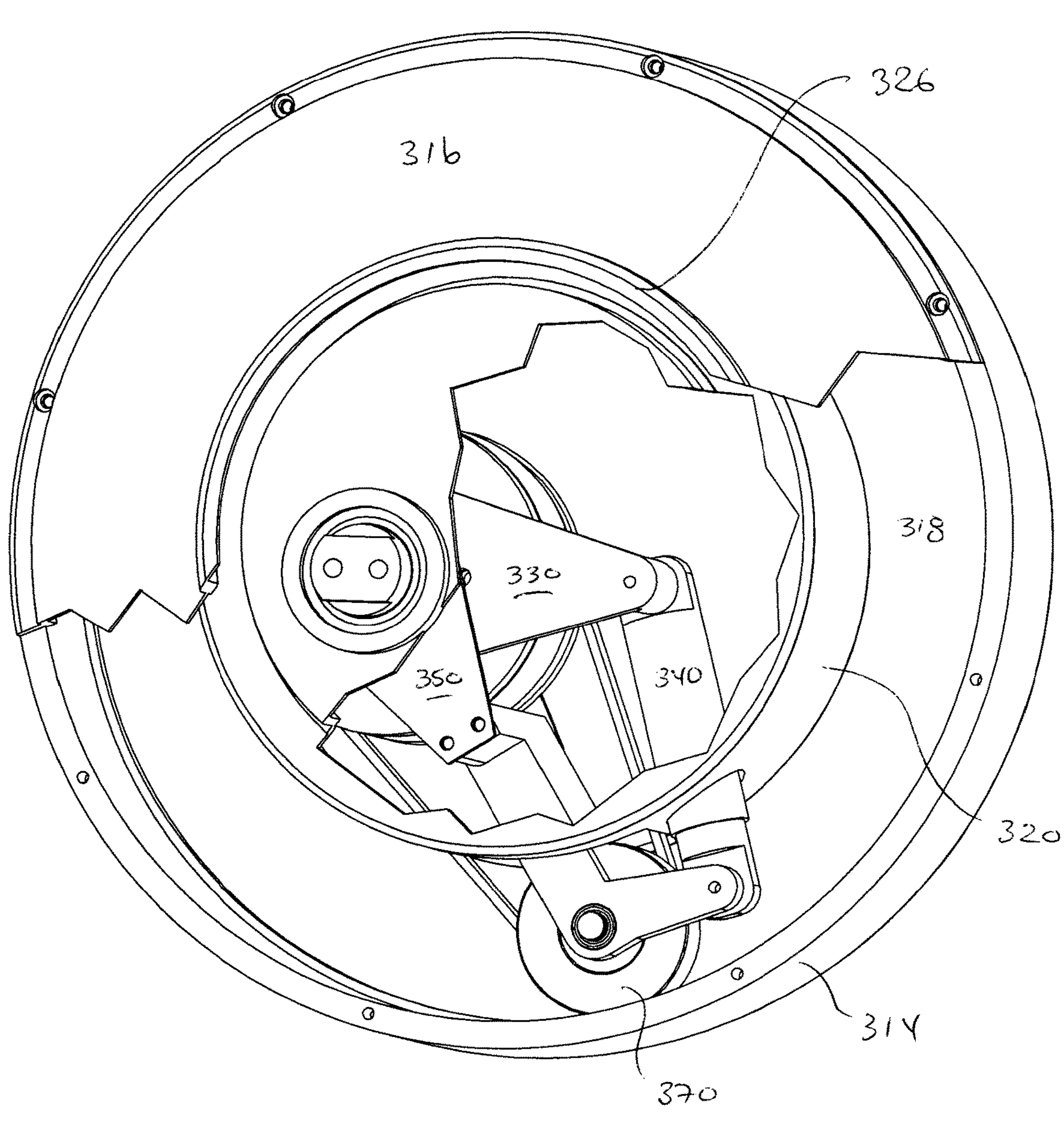
FIG. 9 is a perspective side view of the device of FIG. 8 in the compressed position.
Figure 10:
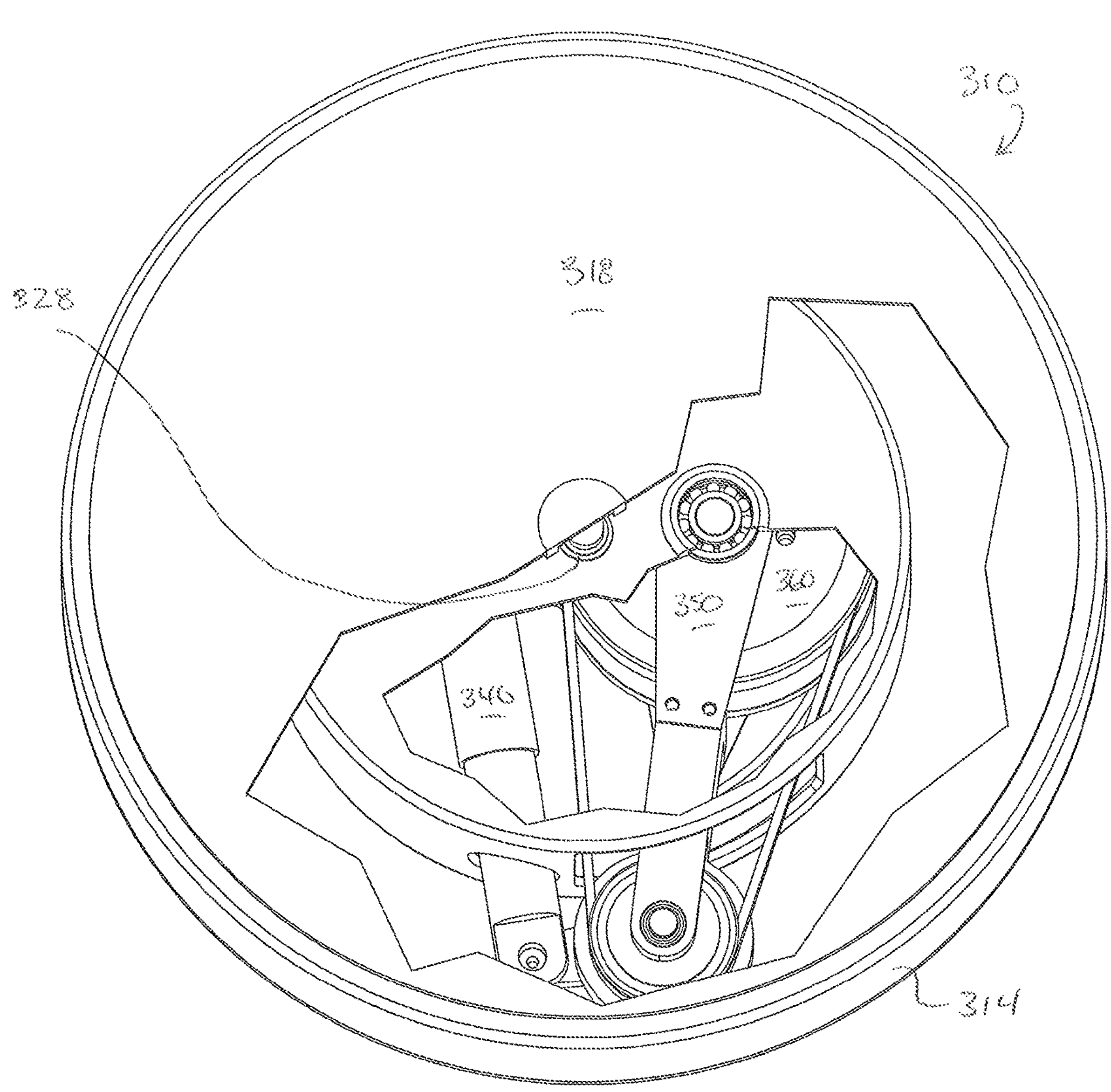
FIG. 10 is a perspective side view of the device of FIG. 8 showing the other side of the device configured to have a cover without an opening.

FIG. 8 illustrates device 310 in the normal or at rest position, while FIG. 9 illustrates device 310 in the compressed position. In the event that only one of covers 316,318 has an opening, the other cover, i.e., the other side, may be configured as shown in FIG. 10. Here, cover 318 does not have an opening and bearing 328 is mounted to cover 318.

It can be seen, in FIGS. 8-10, that housing cover 316 and mount bracket 320 are partially cutaway, while in FIGS. 8-9, annular bearing 326 is partially removed.

Figure 11A:
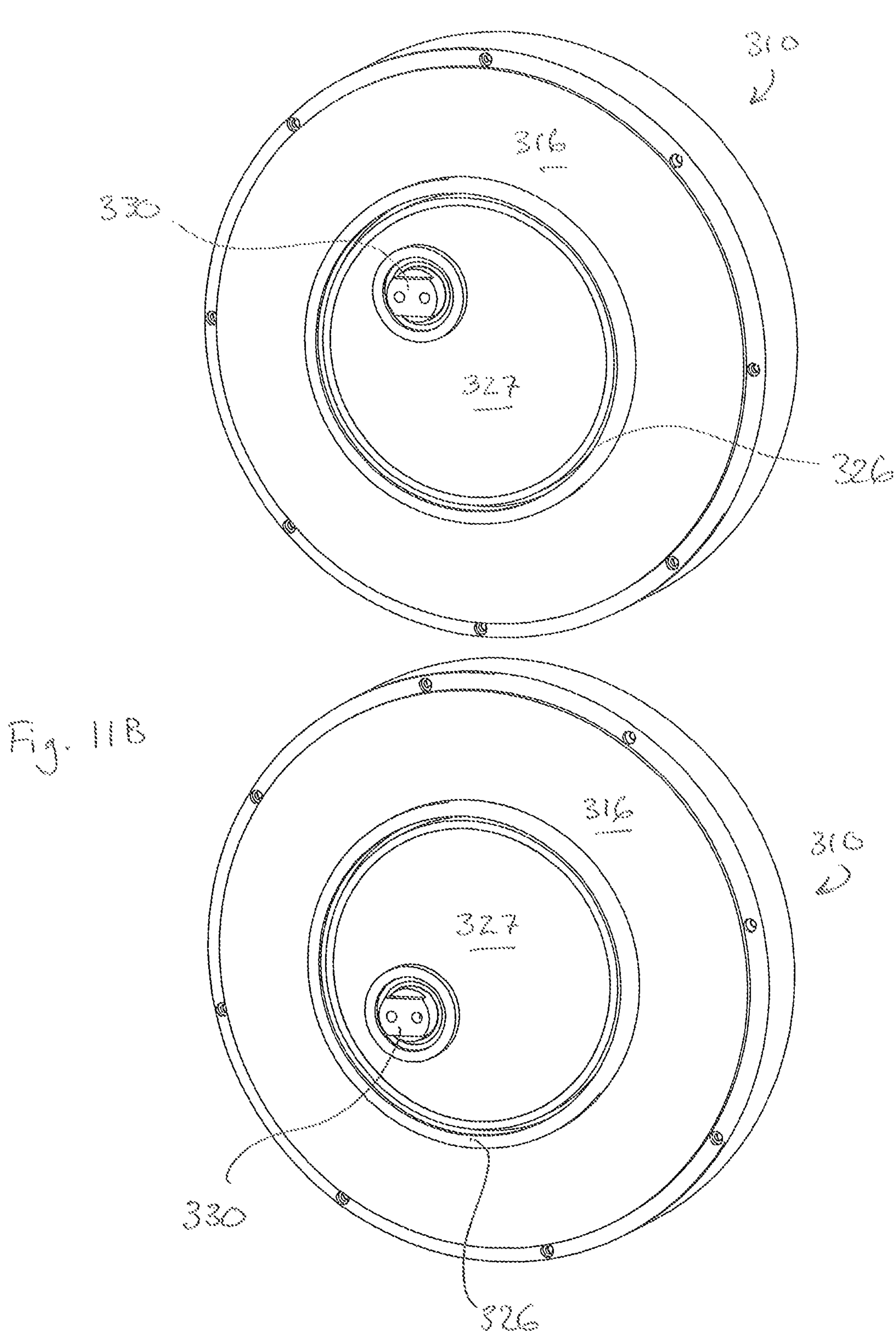
FIG. 11A is a perspective non-cutaway side view of the device of FIG. 8 with load connect 330 at rest.

Referring to FIGS. 11A-11B, perspective non-cutaway views of device 310 with load connect 330 at rest (FIG. 11A) and under load (FIG. 11B) are respectively shown.

Figure 12:
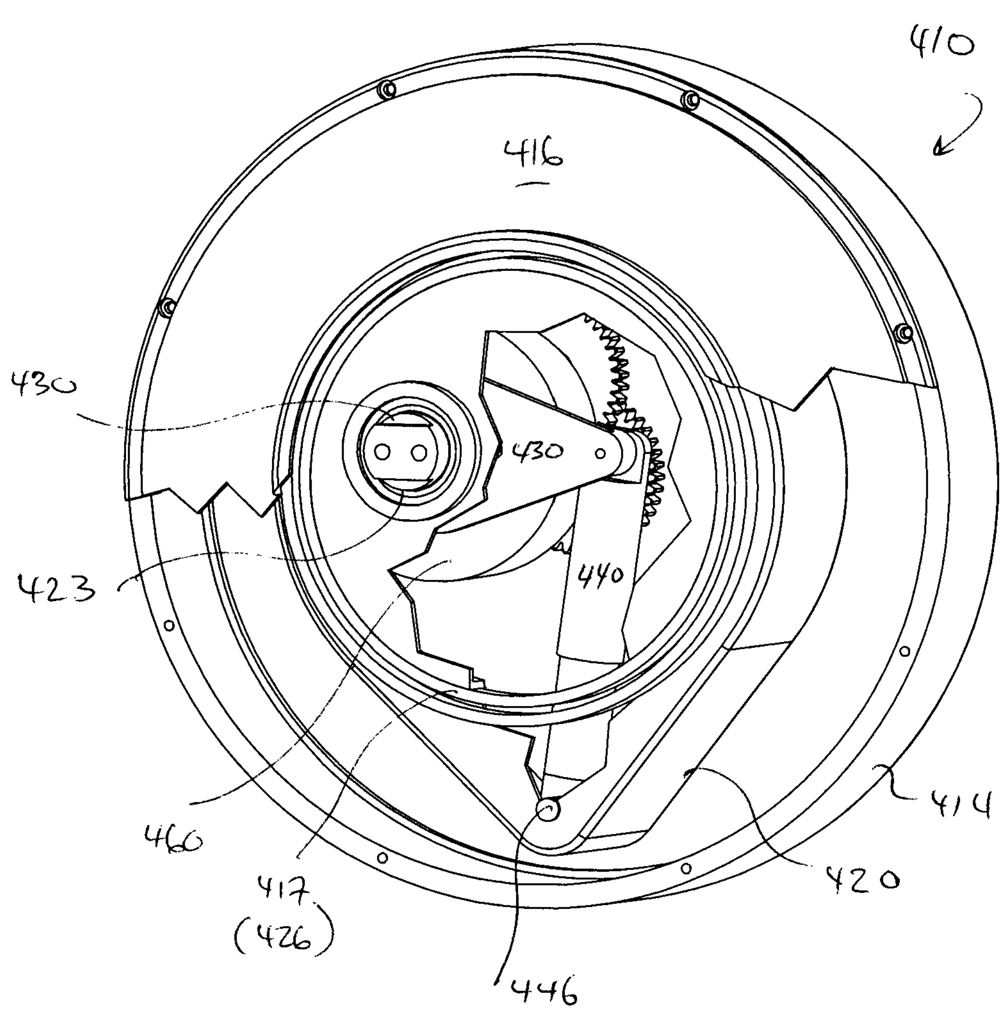
FIG. 12 is a perspective side view of another embodiment of an internal drive wheel 410 in accordance with the present invention.
Figure 13:
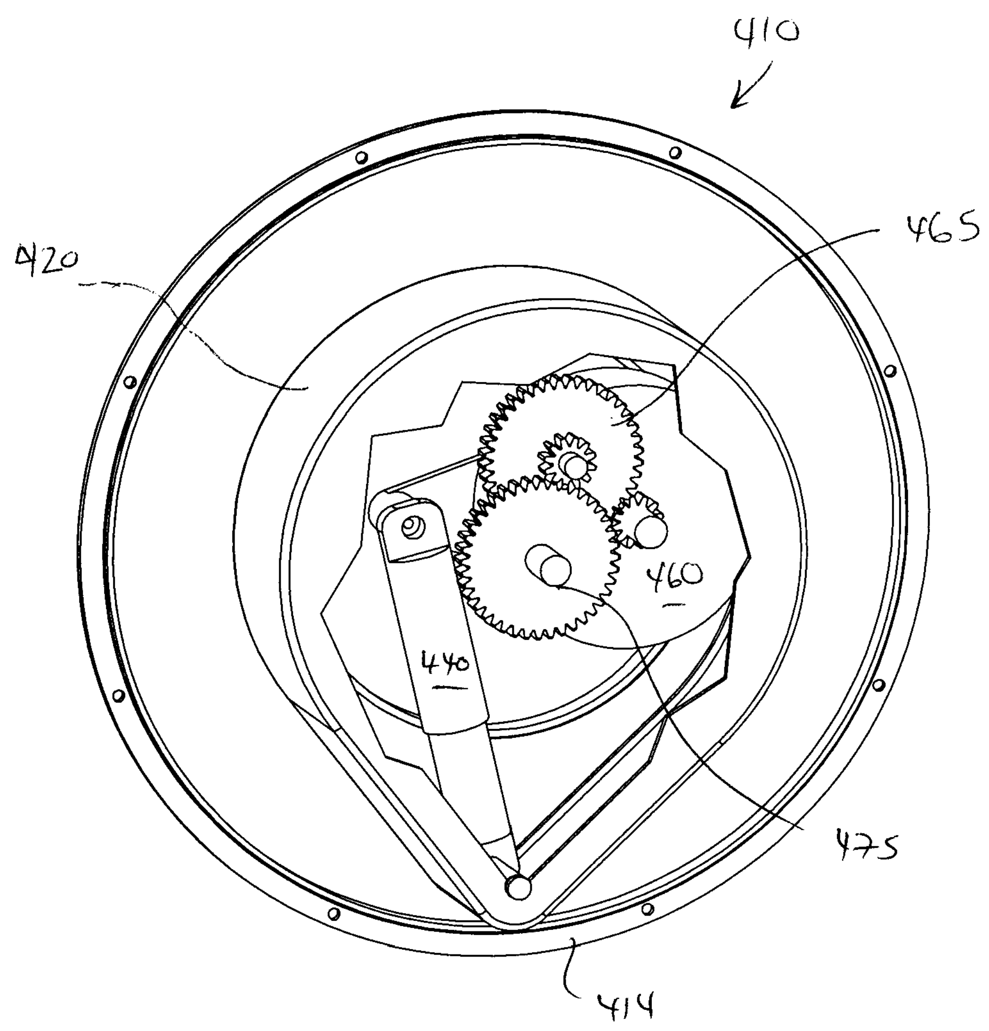
FIG. 13 is another perspective side view of the device of FIG. 12.
Figure 14:
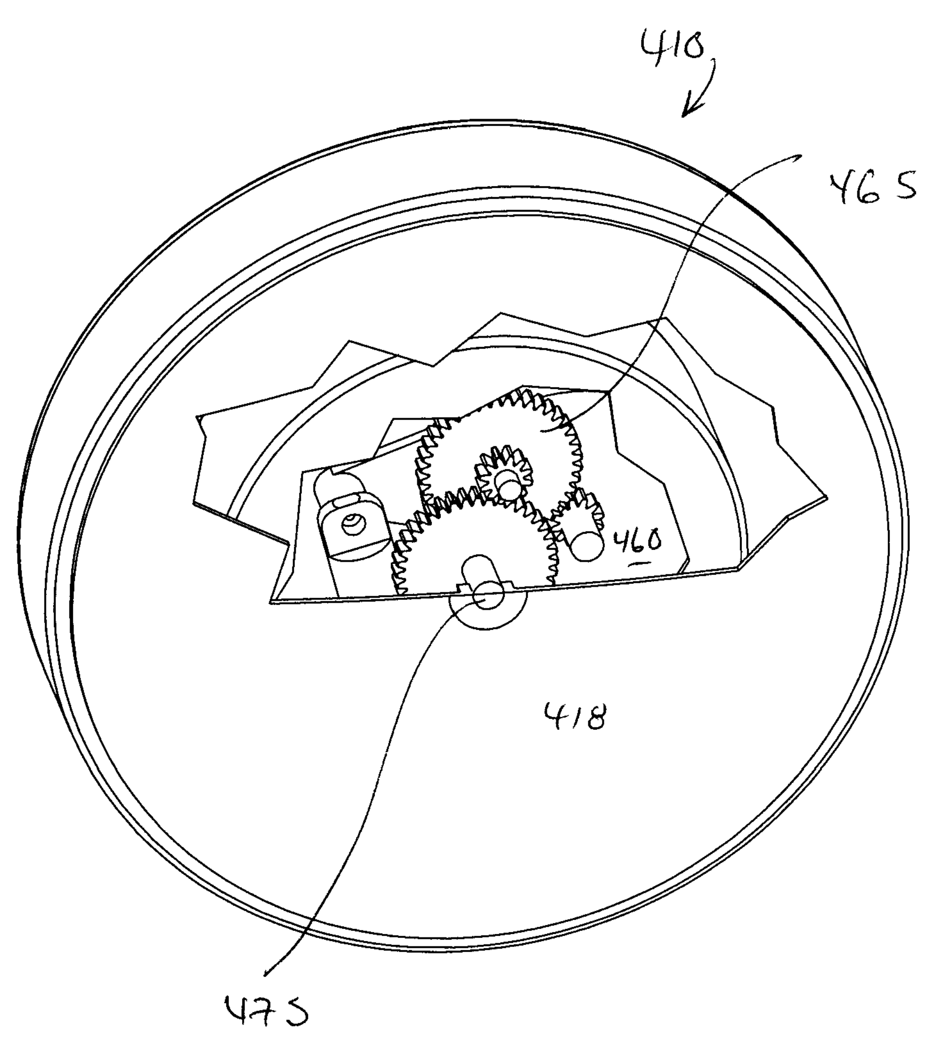
FIG. 14 is another perspective side view of the device of FIG. 12.

Referring to FIGS. 12-14, perspective side views of another embodiment of an internal drive wheel 410 in accordance with the present invention are shown. Device 410 may include components that are the same or similar to those in devices 410 above, such as rim 414, cover 416 that defines opening 417, rotatable mount bracket 420, pivot structure 423, annular bearing 426, load connect 430, and shock absorber 440 that is coupled between the load connect and the bottom of mount bracket 420.

In device 410, the wheel rim is driven through housing cover 418. As shown in FIG. 13, motor 460 drives a gear arrangement 465 that drives axle 475. Axle 475 is fixedly coupled to cover 418 which in turn is coupled to rim 414. Thus, as the motor turns the gear arrangement, the axle drives the wheel. This gear/cover drive arrangement could be configured in many ways without departing from the present invention.

Load connect 430 moves up and down in a manner similar to load connect 330 in FIGS. 8-11B.

Figure 15:
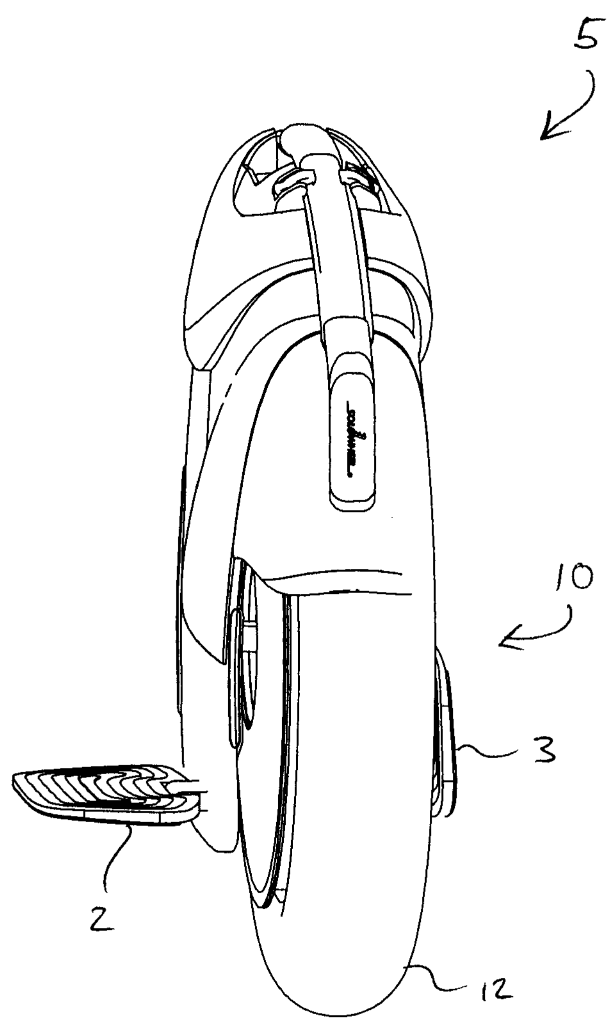

Referring to FIG. 15, an electronic unicycle device 5 having an internal drive wheel in accordance with the present invention is shown. Device 5 may use any of the wheel embodiments herein (or based thereon) that allow access to the load connect (30, etc.) on both sides. Pedals or foot platforms 2,3 are proved on each side of the wheel (10, etc.) and coupled through the cover openings to the load connect.

Figure 16:
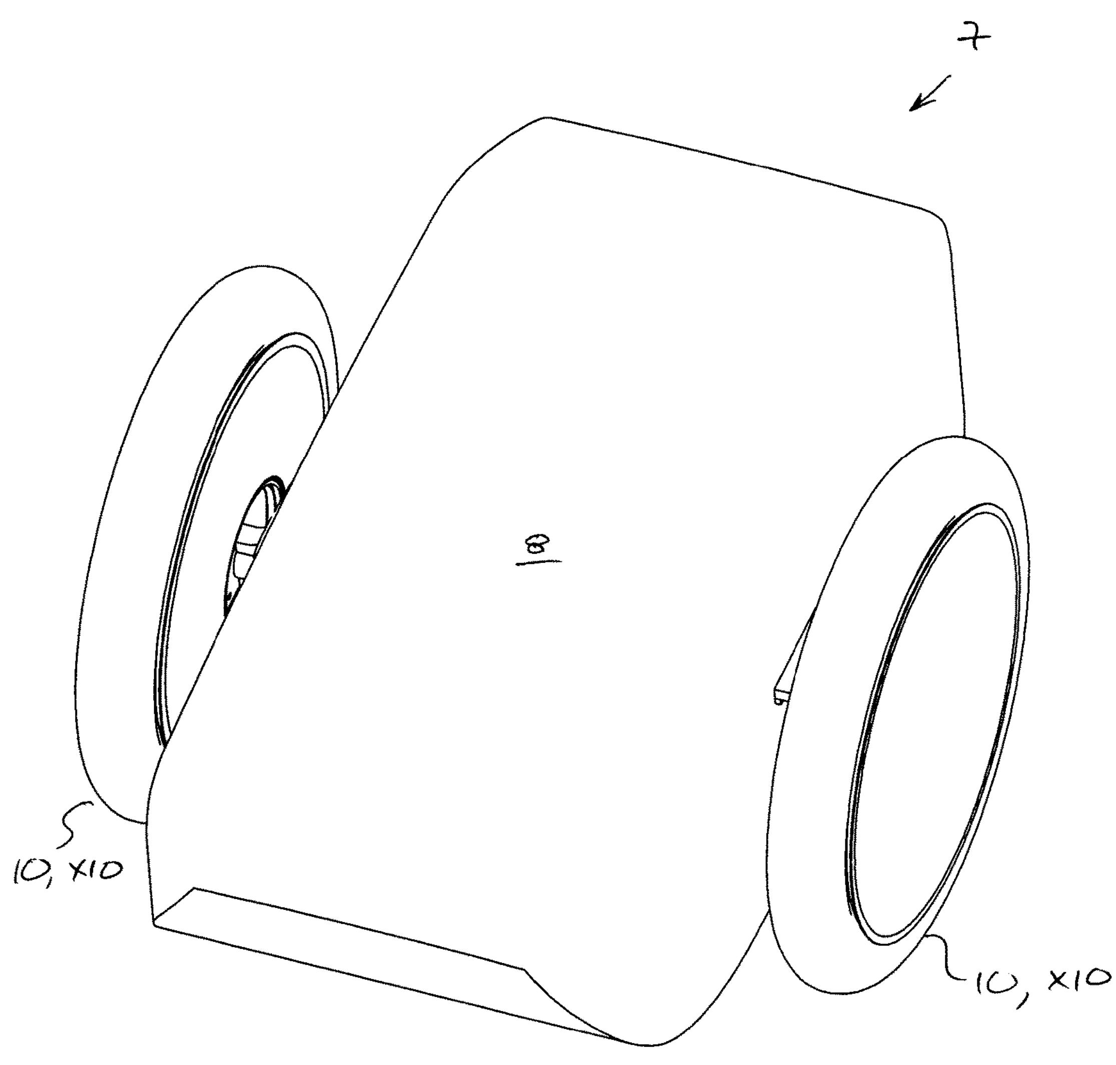
FIG. 16 is a perspective view of a 2-wheeled vehicle having internal derive wheels, in accordance with the present invention.

Referring to FIG. 16, a two wheeled electric vehicle 7 having an internal drive wheel in accordance with the present invention is shown. Device 7 may be a hoverboard or 2-wheeled car or other. A platform 8 is provided between the wheels which may be any wheels herein that allow connection to the load connect through one side of the wheel, for example, those describe with reference to FIGS. 5,6,10 and 14. X10 represents a suitable wheel in accordance with the present invention.

Figure 17:
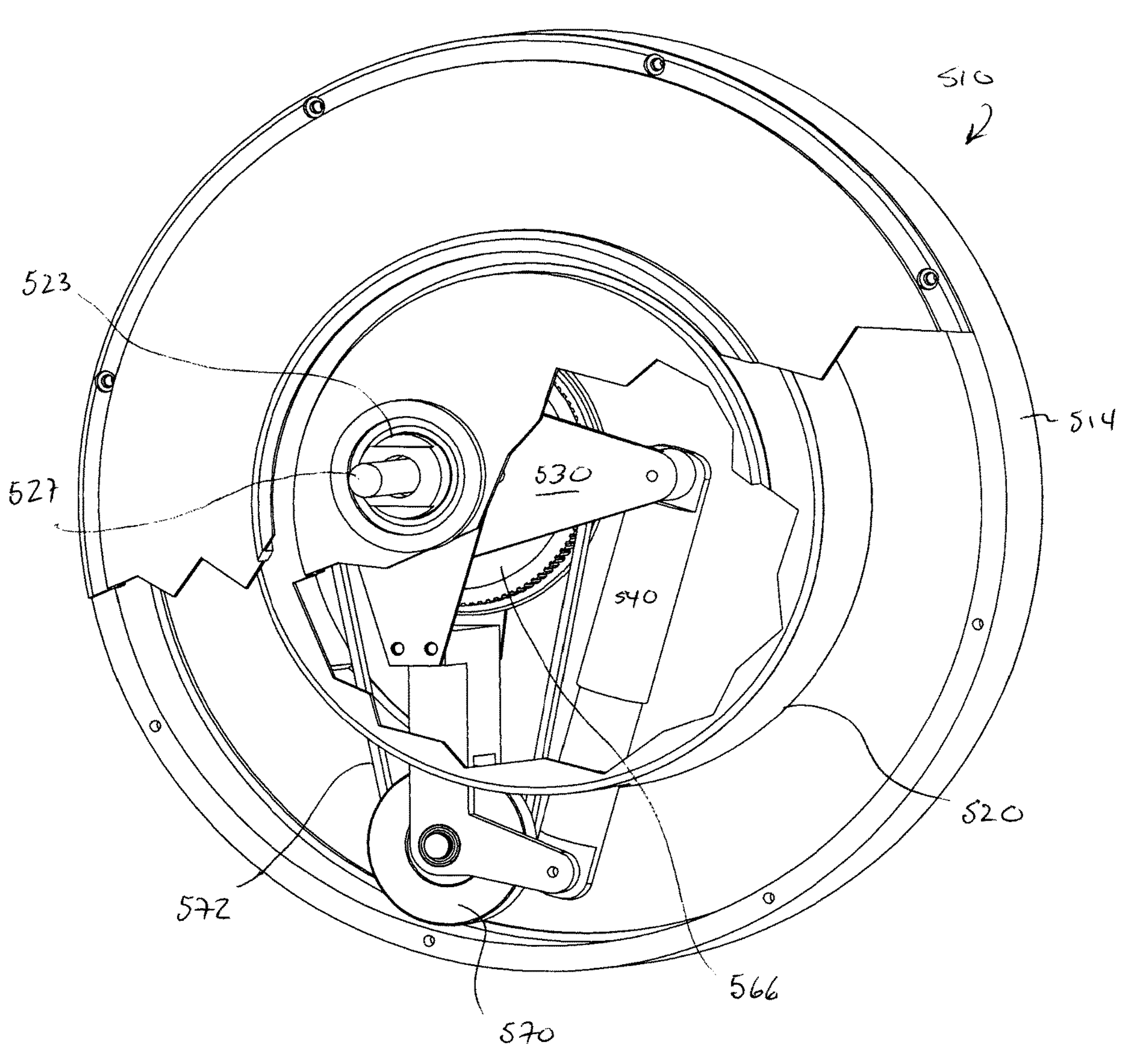
FIGS. 17-18 are perspective view of two more embodiments of a wheel 510 and 610, respectively, in accordance with the present invention.

Referring to FIG. 17, another embodiment of a wheel 510 in accordance with the present invention is shown. Wheel 510 is distinct from others herein in that the motor 60, etc., has been removed and a drive axle 527 has been added at pivot 523. The mount bracket 520, load connect 530 and shock absorber 540 function as in other embodiments herein, yet the motor (not shown) is external to the wheel and coupled to axle 527. Motor 60, etc. (meaning 160,260, 360,460 and so on), is replaced by a drive wheel 566 that drives belt 572 and, in turn, roller 570.

Figure 18:
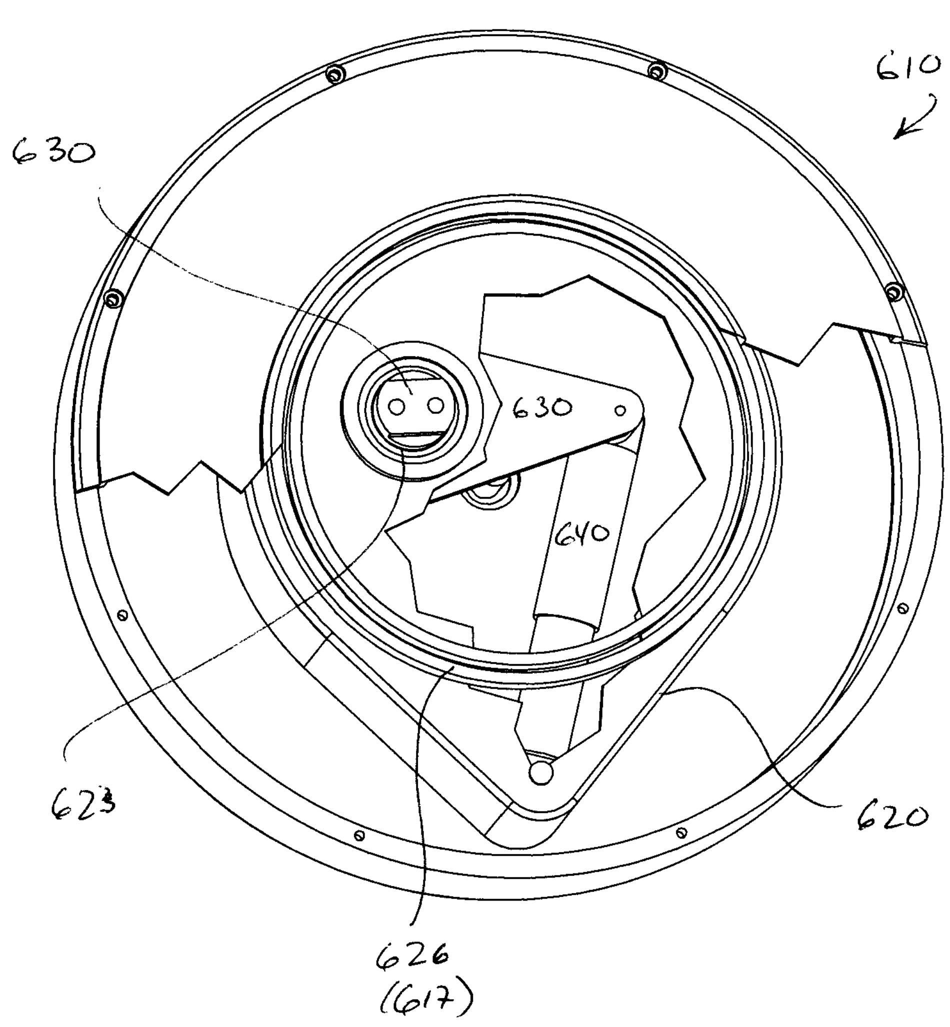
Figure 9:
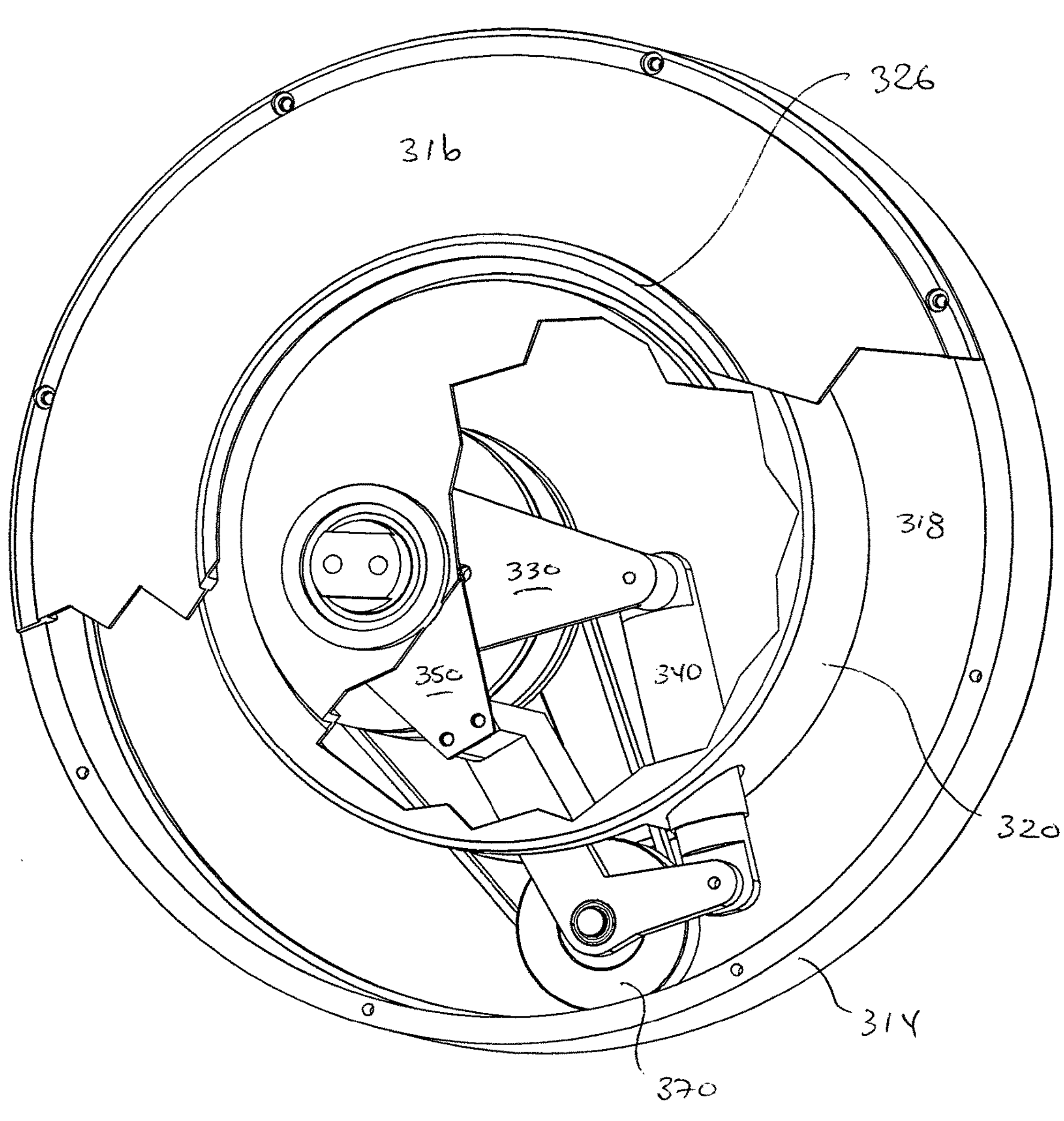

Referring to FIG. 18, a perspective side view of yet another embodiment of a wheel 610 in accordance with the present invention. Device 610 is similar to other wheels discussed herein (as shown), yet there is no drive mechanism—no motor and no friction roller or gear/pulley based drive assembly, etc. Wheel 610 may be thought of as a "follow" wheel. It does not drive a vehicle, but could follow or otherwise support a vehicle (like the rear wheels on a front-wheel drive car) or a trailer or the like. Wheel 610 provides the shock absorbing and potentially regenerative features of the present invention discussed elsewhere herein.

It should be recognized that the techniques/teachings of FIGS. 17 and 18 could be implemented in the other embodiments herein. For example, the internal drive devices above could be configured consistent with the teachings of FIG. 17 to be externally driven. Similarly, the "follow" wheel structure of FIG. 18 could be inserted into any of the wheels discussed above or any wheels related thereto. Further, if the teachings of FIG. 18 are utilized in devices 10,110 or 310, the roller 70,170,370 may have any configuration that is suitable for engaging its respective rim.

Since the device motors can be used as a generator, the movement of the motor drive mechanism (roller in FIGS. 1-4, 8-10 or gear in FIGS. 5-6, 12-14) along the rim during compression and decompression (of the shock absorber/suspension device) can be electronically damped to regenerate energy and store in the battery. Resistance from energy regeneration replaces the energy dissipation via heat that would be used in a conventional shock absorbing or damping system.

It should be recognized that the wheels discussed herein, particularly the internal drive wheels, will have a battery, control circuit, and potentially other electrical components (as in the electric unicycle device of FIG. 15 or other).

The openings 17, etc., and 19, etc., when providing access to load connect 30, etc., are preferably covered, in use, to prevent dirt from entering the wheel. In some figures, this cover is removed to see interior wheel components. Depending on the requirements and design of a given embodiment, this "sub-cover" may be made of a flexible membrane or other.

The housing covers that drive a wheel, such as 418 of FIG. 14, are preferably made of a thicker or sturdier material than the housing covers of wheels driven by a roller.

It should also be recognized that the position of axis structure 23, etc., is preferably not coaxial with the axis of rotation of its respective wheel.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A wheel device, comprising:

a rim having an axis of rotation;

a movable mount bracket that is configured to be rotatable relative to the rim, the degree of rotation of the mount bracket being fully independent from the degree of rotation of the rim; and a load connect structure that is pivotally coupled to the mount bracket such that the load connect structure is configured to pivot relative to the mount bracket about a pivoting axis, and such that the mount bracket is configured to guide the load connect structure to move up and down;

wherein the mount bracket rotates coaxially with the axis of rotation of the rim and remains coaxial with the rim during up and down movement of the load connect structure; and wherein the pivoting axis between the load connect structure and mount bracket is non-coaxial with the axis of rotation of the rim;

further comprising a rim support structure coupled to the rim, wherein the mount bracket is rotatably coupled to the rim support structure; and wherein the rim support structure comprises an access opening within the rim support structure, wherein the load connect structure is accessible through the access opening, and wherein the mount bracket is rotatably coupled to the rim support structure adjacent the access opening and configured for rotational movement relative to the rim support structure.

2. The device of claim 1, further comprising a drive mechanism configured to achieve a driving of the rim, wherein the drive mechanism is mounted on the mount bracket, on the load connect structure, or on an interconnecting sled structure that interconnects and positions the drive mechanism and that is pivotally coupled to the mount bracket or load connect structure.

3. The device of claim 1, further comprising:

a drive mechanism that includes at least one of a roller, gear and pulley;

wherein at least one of the roller, gear and pulley are configured to achieve a driving of the rim.

4. The device of claim 1, further comprising a shock absorber that receives a compressive force from the load connect structure and returns the load connect structure to an at-rest position in the absence of a compressive force.

5. The device of claim 4, wherein in the presence of a compressive force on the load connect structure, the load connect structure moves down relative to the rim, the shock absorber compresses and the mount bracket rotates.

6. The device of claim 1, further comprising a second rim support structure coupled to the rim and rotatably coupled to the mount bracket, wherein the rim support structure is on one side of the wheel and the second rim support structure is on the other side of the wheel.

7. The device of claim 6, further comprising a second access opening within the second rim support structure, wherein the load connect structure is accessible through at least one of the first and second access openings.

8. The device of claim 2, further comprising a motor for driving the drive mechanism.

9. The device of claim 2, further comprising a drive shaft which receives rotating force from an external drive source to drive the drive mechanism.

10. The device of claim 2, wherein the drive mechanism drives the rim via a rim support structure.

11. The device of claim 1, further comprising a motor configured to achieve a driving of the rim, wherein the motor is mounted on the mount bracket.

12. An internal drive wheel device, comprising:

a rim having an axis of rotation;

a rim support structure coupled to the rim and defining a first access opening;

a rotatable mount bracket coupled to the rim support structure adjacent the first access opening and configured for rotational movement relative to the rim support structure; and a load connect structure that is accessible through the first access opening and configured to move up and down in response to a shock force;

a shock absorber that receives a compressive force from the load connect structure and returns the load connect structure to an at-rest position in the absence of that compressive force;

a drive mechanism configured to achieve a driving of the rim; and a drive motor that drives the drive mechanism to in turn drive the rim;

wherein, in the presence of a compressive force, the load connect structure moves down relative to the rim, the shock absorber compresses and the mount bracket rotates, the load connect structure and the shock absorber move with the mount bracket.

13. The device of claim 12, wherein the drive mechanism is coupled to the rim to drive the rim.

14. The device of claim 12, wherein the drive mechanism drives the rim via a rim support structure.

* * * * *